2 Sheets—Sheet 1.

C. COY.
SHINGLE-JOINTER.

No. 182,518. Patented Sept. 26, 1876.

WITNESSES:
D. P. Cowl
Jno. P. Jacobs

Charles Coy
INVENTOR.

J. Mc. Perkins
ATTORNEY

C. COY.
SHINGLE-JOINTER.
No. 182,518. Patented Sept. 26, 1876.
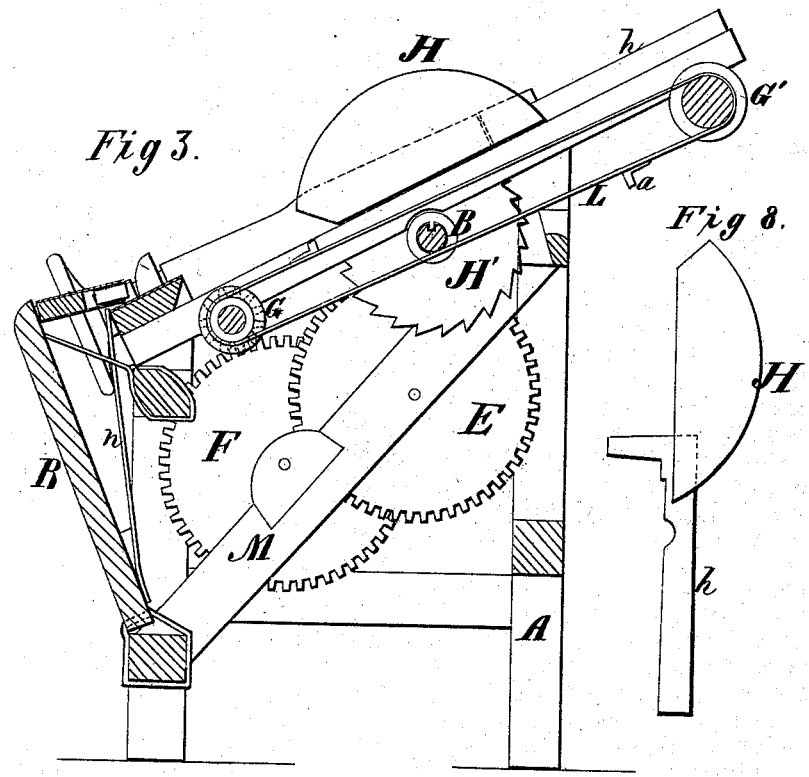
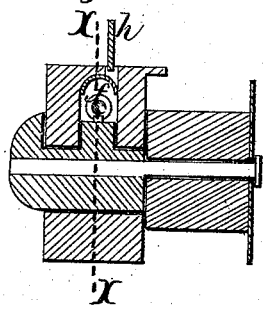
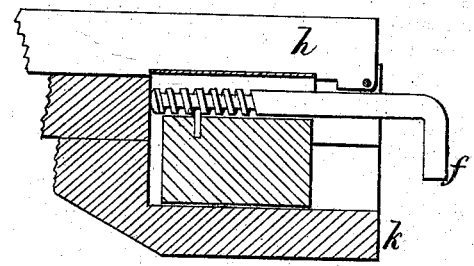
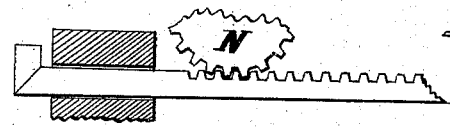
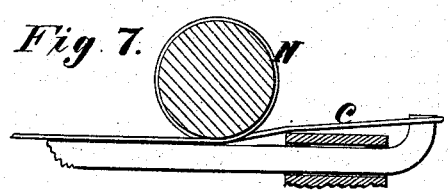
WITNESSES:
D. P. Cowl
Jno. P. Jacobs
Charles Coy
INVENTOR.
J. McC. Perkin
ATTORNEY.

UNITED STATES PATENT OFFICE.

CHARLES COY, OF BIG RAPIDS, MICHIGAN.

IMPROVEMENT IN SHINGLE-JOINTERS.

Specification forming part of Letters Patent No. 182,518, dated September 26, 1876; application filed March 10, 1876.

*To all whom it may concern:*

Be it known that I, CHARLES COY, of Big Rapids, in the county of Mecosta and State of Michigan, have invented certain new and useful Improvements in Shingle-Jointers; and I do hereby declare that the following is a full, clear, and exact description thereof, that will enable others skilled in the art to which it appertains to make and use the same, reference being had to the accompanying drawings, and to the letters and figures of reference marked thereon, which form a part of this specification.

The same letters and figures of reference are used to indicate the corresponding parts. After describing the invention, its nature and extent will be shown in the claims.

The object of my invention is to furnish a machine which will edge shingles, or make each shingle of uniform width with parallel sides. I am aware that there are now machines made for this purpose; but they are quite different from my invention.

Figure 1:
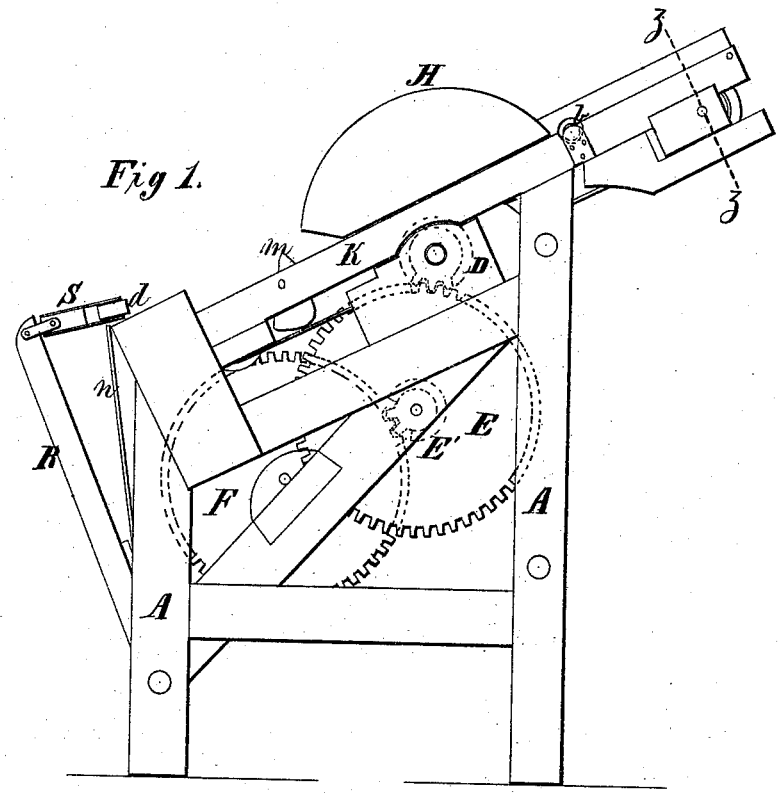
Figure 2:
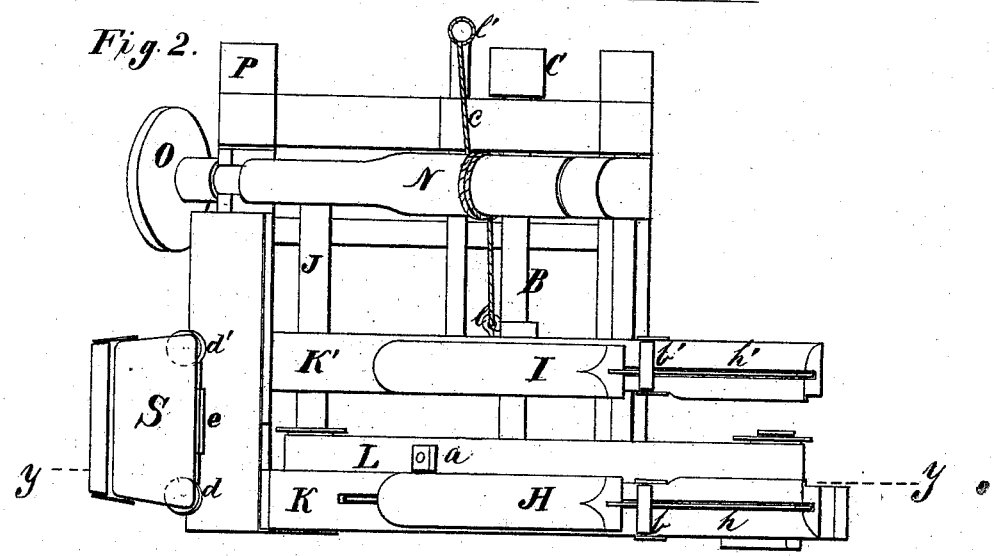

Figure 1 is a side view; Fig. 2, a plan view. Fig. 3 is a sectional view taken through the lines $x\,x$; and Figs. 4, 5, 6, 7, and 8 are detail sectional views.

A is the frame, which is rectangular in shape, the front corner-posts being about three feet high, and the rear posts about four and a half feet high, so that the ways K K' will be about five feet long. M is a part of the frame running diagonally across the frame from the lower front to the upper rear, and serves for the bearings to the shafts of wheels E and F. B is the saw-arbor, on which are placed the fixed saw H' and a movable saw. The movable saw is furnished with a collar and sleeeve, and feathered to the arbor in the usual way. C is a small drum, which receives the power. D is a pinion on the arbor B, and engages with the cog-wheel E. E' is a pinion on the same shaft with E, and engages the wheel F, which in turn gives motion to a pinion on the shaft J, on which is placed a small drum, G, which is connected with the drum G' by the belt L. *a a* are dogs on the belt L. H and I are shields which cover the fixed and movable saws. *h h'* are guards, which are fastened to the shields at one end, while the other end is hinged to the upper and higher part of the ways K K'.

R is the starter, which is kept in position by the elastic rod *n*. To the upper end of the starter is hinged the plate S, which is provided with the hooded rollers *d d'* and the solid edge. N is a shaft, which has bearings on the front and rear of the frame, the front end of which is provided with the wheel O, by which it receives its motion. *c* is a cord fastened at *l'* on the outside of the frame, and at *l* on the movable way K', and is wound once or twice around the shaft N. By this device the width between the ways K and K' is readily varied by turning the wheel O. *b b'* are small rollers sunk in the ways K K' just above the shields. *k* is a button, which secures the bearing of the drum G', and *f* is a small screw, by means of which the belt L may be tightened. In lieu of the cog-wheels a belt may be used on drums, and on the shaft N it may be found that a ratchet can be quite as well used, as shown in Fig. 6. *m* is a swinging pivot on the outer way K.

I will now describe the operation of my invention.

Place the shingle with its upper right-hand corner on the swinging pivot *m*, and its lower and thicker part on the rest next to the covered rollers *d d'*. Then with the knee push the starter R until the shingle strikes the saw under the shield. Here is one of the main points of my invention. For it will be observed that if the shingle is laid down even crosswise the starter brings it up square when it touches the saw. After the shingle has traveled about four inches it falls on the ways and then is carried over the ways by the dogs on the belt. The guards keep the shingle on the ways until it falls over the top, while the rollers *b b'* aid this object by preserving the momentum already acquired, and the refuse part falls at the upper outside.

The design in constructing the machine so that the top should be at an angle of about forty-five degrees is that, in moving the shingle on the start, the weight of the shingle is made to assist in squaring it with the starter, providing it should be carelessly laid on. Also, in elevating the shingle, the whole machinery connected with the ways is placed much nearer the workman, and so is more easily controled.

Having now fully explained my invention, what I claim, and desire to secure by Letters Patent, is—

1. In a shingle-jointer, the starter R and elastic rod $n$ in combination with the plate S provided with the rollers $d\,d'$, substantially as described, and for the purposes set forth.

2. The shaft N, provided with the wheel O, in combination with the cord or band $c$ and the movable way K, substantially as described, and for the purposes set forth.

3. The inclined ways K K', saws H', and arbor B in combination with the shields H I, the guards $h\,h'$, and the rollers $b\,b'$, substantially as described, and for the purposes set forth.

In testimony that I claim the foregoing I have hereunto set my hand this 7th day of March, 1876.

CHARLES COY.

Witnesses:
 J. A. GRISWOLD,
 PAUL SOBOLESKI.